US012759322B2

(12) United States Patent
Yamakami et al.

(10) Patent No.: US 12,759,322 B2
(45) Date of Patent: Oct. 13, 2026

(54) INKJET RECORDING APPARATUS

(71) Applicant: KYOCERA Document Solutions Inc., Osaka (JP)

(72) Inventors: Kohei Yamakami, Osaka (JP); Naoto Miyashita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 209 days.

(21) Appl. No.: 18/806,269

(22) Filed: Aug. 15, 2024

(65) Prior Publication Data

US 2025/0065620 A1 Feb. 27, 2025

(30) Foreign Application Priority Data

Aug. 23, 2023 (JP) ................................ 2023-135527

(51) Int. Cl.

| | |
|---|---|
| ***B41J 13/08*** | (2006.01) |
| ***B41J 2/045*** | (2006.01) |
| ***B41J 2/165*** | (2006.01) |
| ***B41J 11/00*** | (2006.01) |

(52) U.S. Cl.

CPC ............ *B41J 13/08* (2013.01); *B41J 2/0457* (2013.01); *B41J 2/04581* (2013.01); *B41J 2/04588* (2013.01); *B41J 2/16508* (2013.01); *B41J 2/1652* (2013.01); *B41J 2/16526* (2013.01); *B41J 2/16585* (2013.01); *B41J 11/007* (2013.01); *B41J 2002/16573* (2013.01); *B41J 2002/16591* (2013.01)

(58) Field of Classification Search

CPC ...... B41J 13/08; B41J 2/0457; B41J 2/04581; B41J 2/04588; B41J 2/16508; B41J 2/1652; B41J 2/16526; B41J 2/16585; B41J 11/007; B41J 2002/16573; B41J 2002/16591

See application file for complete search history.

(56) References Cited

U.S. PATENT DOCUMENTS

2023/0311479 A1* 10/2023 Otana ................. B41J 2/16508 347/9

FOREIGN PATENT DOCUMENTS

JP 2004268563 A * 9/2004 .......... B41J 2/16585
JP 2016-022673 A 2/2016

* cited by examiner

*Primary Examiner* — Justin Seo

(74) *Attorney, Agent, or Firm* — Stein IP, LLC

(57) ABSTRACT

An inkjet recording apparatus includes: a conveyance belt; a recording head that includes a pressurized chamber which stores an ink, a nozzle which communicates with the pressurized chamber and a displacement element which applies a pressure to the pressurized chamber to discharge the ink; and a control unit, the conveyance belt includes a flushing region, the control unit causes the recording head to perform flushing processing that discharges the ink to an opening in the flushing region and the control unit controls the application of a voltage to the displacement element such that the flying speed of the ink discharged during the flushing processing is faster than the flying speed of the ink discharged during image formation processing.

6 Claims, 11 Drawing Sheets

INKJET RECORDING APPARATUS

INCORPORATION BY REFERENCE

This application is based upon and claims the benefit of priority from the corresponding Japanese Patent Application No. 2023-135527 (filed on Aug. 23, 2023), the entire contents of which are incorporated herein by reference.

BACKGROUND

The present disclosure relates to inkjet recording apparatuses.

A conventional inkjet recording apparatus includes a recording head which discharges an ink. The recording head includes a nozzle which discharges the ink. The recording head discharges the ink to a recording medium being conveyed to record an image on the recording medium.

SUMMARY

An inkjet recording apparatus according to an aspect of the present disclosure includes a conveyance belt, a recording head and a control unit. The conveyance belt conveys a recording medium. The recording head includes a pressurized chamber which stores an ink, a nozzle which communicates with the pressurized chamber and a displacement element which deforms by receiving application of a voltage to apply a pressure to the pressurized chamber so as to discharge the ink from the nozzle, and the recording head discharges the ink to the recording medium to form an image on the recording medium. The control unit controls the recording head. The conveyance belt includes a flushing region in which an opening is formed. A plurality of flushing regions each being the flushing region are spaced in the direction of movement of the conveyance belt. The control unit causes the recording head to perform flushing processing separately from image formation processing that discharges the ink to the recording medium, and in the flushing processing, the ink is discharged to the opening in the flushing region that does not overlap the recording medium. The control unit controls the application of the voltage to the displacement element such that the flying speed of the ink discharged from the nozzle during the flushing processing is faster than the flying speed of the ink discharged from the nozzle during the image formation processing.

DETAILED DESCRIPTION

An embodiment of the present disclosure will be described below with reference to FIGS. 1 to 11 using, as an example, a printer 100 which performs printing on a sheet S serving as a recording medium. The type of sheet S is not particularly limited. For example, a sheet is used as the sheet S. In the following description, a direction perpendicular to the installation surface (for example, a flat floor surface) of the printer 100 is defined as an up/down direction.

<Overall Configuration of Printer>

Figure 1:
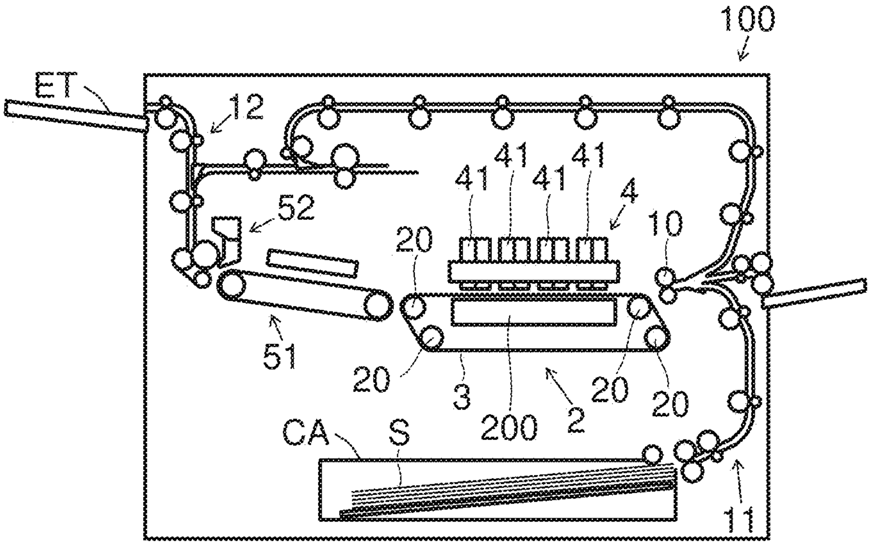
FIG. 1 is a schematic view of an inkjet recording apparatus according to an embodiment.

As shown in FIG. 1, the printer 100 (which corresponds to an "inkjet recording apparatus") of the present embodiment includes a first conveyance unit 11 and a second conveyance unit 12. The first conveyance unit 11 feeds the sheet S set in a paper feed cassette CA, and coveys the sheet S toward a printing position. In a print job performed by the printer 100, an ink is discharged to the sheet S which is passed through the printing position. In this way, an image is printed on the sheet S. In other words, in the print job performed by the printer 100, the image made of the ink is formed on the sheet S. The second conveyance unit 12 conveys the sheet S which has been printed. The second conveyance unit 12 ejects the sheet S which has been printed to an ejection tray ET.

The first conveyance unit 11 includes a plurality of conveyance roller members which include a registration roller pair 10. In FIG. 1, a symbol is provided to only the registration roller pair 10 among the conveyance roller members. The conveyance roller members each are rotated to convey the sheet S. The registration roller pair 10 includes a pair of rollers which are pressed against each other. A registration nip is formed between the pair of rollers of the registration roller pair 10. The sheet S which is fed from the paper feed cassette CA enters the registration nip. The registration roller pair 10 is rotated to convey the sheet S toward a belt conveyance unit 2 which will be described later.

When the front edge of the sheet S reaches the registration nip, the rotation of the registration roller pair 10 is stopped. On the other hand, conveyance roller members which are on the upstream side of the registration roller pair 10 in the direction of conveyance of the sheet S are rotated. In this way, the skew of the sheet S is corrected.

The printer 100 includes the belt conveyance unit 2. The belt conveyance unit 2 receives the sheet S from the first conveyance unit 11, and conveys the sheet S. The belt conveyance unit 2 includes a plurality of tension rollers 20. The tension rollers 20 are supported to be able to rotate. The belt conveyance unit 2 also includes a conveyance belt 3. The conveyance belt 3 is seamless. The conveyance belt 3 is rotatably tensioned by the tension rollers 20. The sheet S is conveyed from the first conveyance unit 11 to the belt conveyance unit 2 to reach the outer peripheral surface of the conveyance belt 3.

One of the tension rollers 20 is coupled to a belt motor BM (see FIG. 4), and is rotated by transmission of the driving force of the belt motor BM. The tension roller 20 coupled to the belt motor BM is rotated, and thus the conveyance belt 3 is driven, with the result that the other tension rollers 20 follow the conveyance belt 3 to rotate. In other words, the conveyance belt 3 is rotated.

The belt conveyance unit 2 includes a suction unit 200. The suction unit 200 is arranged on the inner peripheral side of the conveyance belt 3. The suction unit 200 sucks the sheet S on the outer peripheral surface of the conveyance belt 3 from the inner peripheral side of the conveyance belt 3.

Specifically, the conveyance belt 3 includes a plurality of suction holes (not shown). The suction holes of the conveyance belt 3 penetrate in the direction of thickness of the conveyance belt 3. The suction unit 200 sucks the sheet S on the outer peripheral surface of the conveyance belt 3 via the suction holes of the conveyance belt 3. In this way, the sheet S is sucked and attached to the outer peripheral surface of the conveyance belt 3. The conveyance belt 3 is rotated with the sheet S sucked and attached to the outer peripheral surface of the sheet S. In other words, the conveyance belt 3 conveys the sheet S with the sheet S sucked and attached to the outer peripheral surface. Furthermore, in other words, the conveyance belt 3 is moved (that is, rotated) to convey the sheet S. The direction of rotation of the conveyance belt 3 corresponds to the "direction of movement".

The printer 100 includes a recording unit 4. The recording unit 4 is arranged opposite the outer peripheral surface of the conveyance belt 3 in the up/down direction. While the sheet S is being conveyed by the conveyance belt 3, the sheet S on the outer peripheral surface of the conveyance belt 3 is opposite the recording unit 4 in the up/down direction with a distance provided therebetween. In this way, while the sheet S is being conveyed by the conveyance belt 3, the sheet S is passed between the nozzle surfaces of recording heads 40 which will be described later and the outer peripheral surface of the conveyance belt 3. In other words, the area between the nozzle surfaces of the recording heads 40 and the outer peripheral surface of the conveyance belt 3 serves as a part of the conveyance path of the sheet S. The recording heads 40 are arranged above the conveyance belt 3, and the nozzle surfaces of the recording heads 40 are directed downward.

Figure 2:
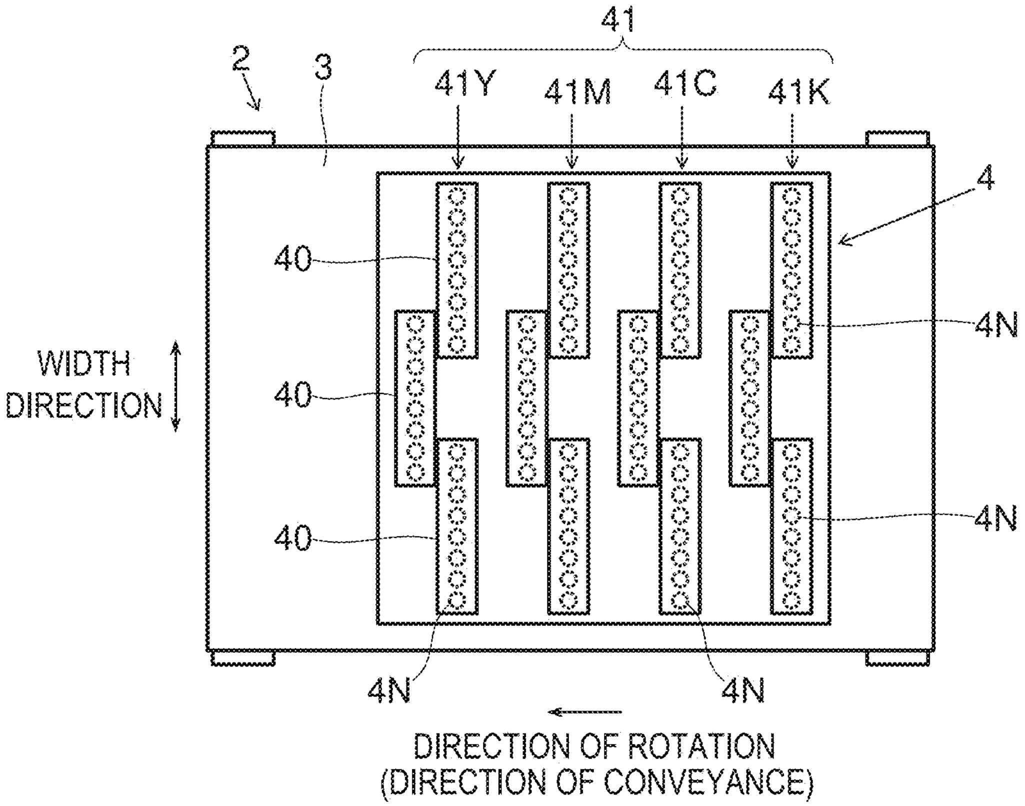
FIG. 2 is a plan view of a recording unit in the inkjet recording apparatus according to the embodiment.

As shown in FIG. 2, the recording unit 4 includes four line heads 41 which correspond to the colors of cyan, magenta, yellow and black, respectively. In FIG. 2, the line head 41 of cyan is identified with a symbol of "C", the line head 41 of magenta is identified with a symbol of "M", the line head 41 of yellow is identified with a symbol of "Y" and the line head 41 of black is identified with a symbol of "K", and thus they are distinguished. The same is true for FIG. 3 which will be referenced in the following description.

Each of the line heads 41 of the individual colors includes a plurality of (for example, three) recording heads 40. For example, the recording heads 40 of the individual colors are arranged in a staggered configuration in a direction perpendicular to the direction of conveyance of the sheet S performed by the conveyance belt 3. In the following description, the direction perpendicular to the direction of conveyance of the sheet S is simply referred to as a width direction.

Each of the recording heads 40 is arranged with a distance away from the outer peripheral surface of the conveyance belt 3 in the up/down direction. In other words, each of the recording heads 40 is arranged in a position opposite the sheet S conveyed by the conveyance belt 3 in the up/down direction. Furthermore, in other words, the conveyance belt 3 sucks and conveys the sheet S below the recording heads 40. A direction perpendicular to the direction of conveyance of the sheet S performed by the conveyance belt 3 and the width direction is the up/down direction.

Each of the recording heads 40 includes, the nozzle surface, a surface opposite the outer peripheral surface of the conveyance belt 3 in the up/down direction. The nozzle surface of each of the recording heads 40 includes a plurality of nozzles 4N. The nozzles 4N of each of the recording heads 40 discharge the ink of the corresponding color downward. For example, each of the recording heads 40 has the same number of nozzles 4N. The nozzles 4N of each of the recording heads 40 are arranged along the width direction of the conveyance belt 3. In FIG. 2, the nozzle 4N is indicated by a dotted line. In actuality, a larger number of nozzles 4N are provided in each of the recording heads 40.

Each of the recording heads 40 discharges, based on image data to be printed on the sheet S in the print job, the ink from the nozzles 4N toward the sheet S on the outer peripheral surface of the conveyance belt 3. The ink discharged from each of the recording heads 40 is adhered to the sheet S. In this way, the image is formed on the sheet S. In other words, the position between the recording heads 40 and the conveyance belt 3 is the printing position, and printing is performed on the sheet S in the printing position.

Figure 3:
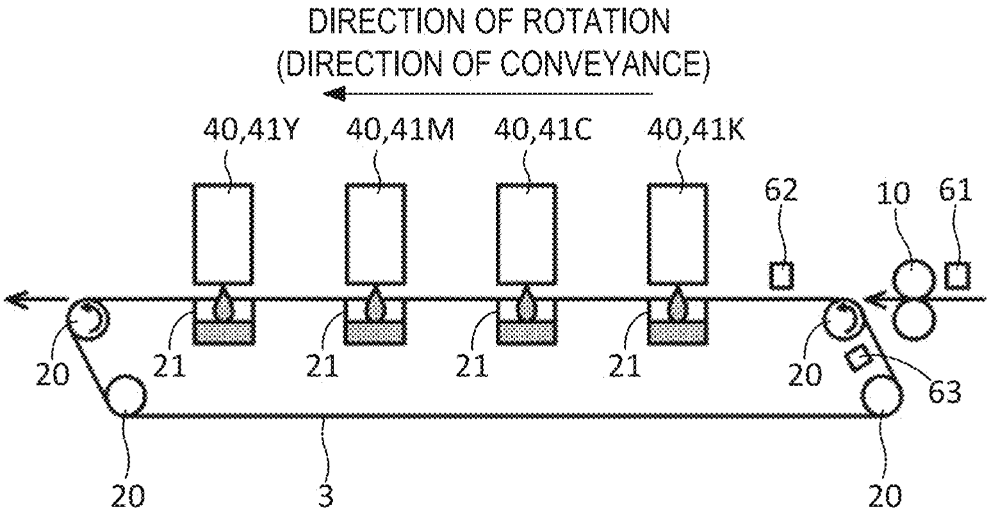
FIG. 3 is a schematic view of a conveyance belt and an area therearound in the inkjet recording apparatus according to the embodiment.

As shown in FIG. 3, on the inner peripheral side of the conveyance belt 3, waste ink tanks 21 are arranged. The waste ink tanks 21 store the inks discharged in flushing processing which will be described later. The inks in the waste ink tanks 21 are discarded.

With reference back to FIG. 1, the printer 100 includes a drying unit 51 and a decurler 52. The drying unit 51 dries, while conveying the sheet S toward the decurler 52, the inks adhered to the sheet S being conveyed. The decurler 52 corrects the curl of the sheet S. The decurler 52 conveys the sheet S in which the curl has been corrected toward the second conveyance unit 12.

Figure 4:
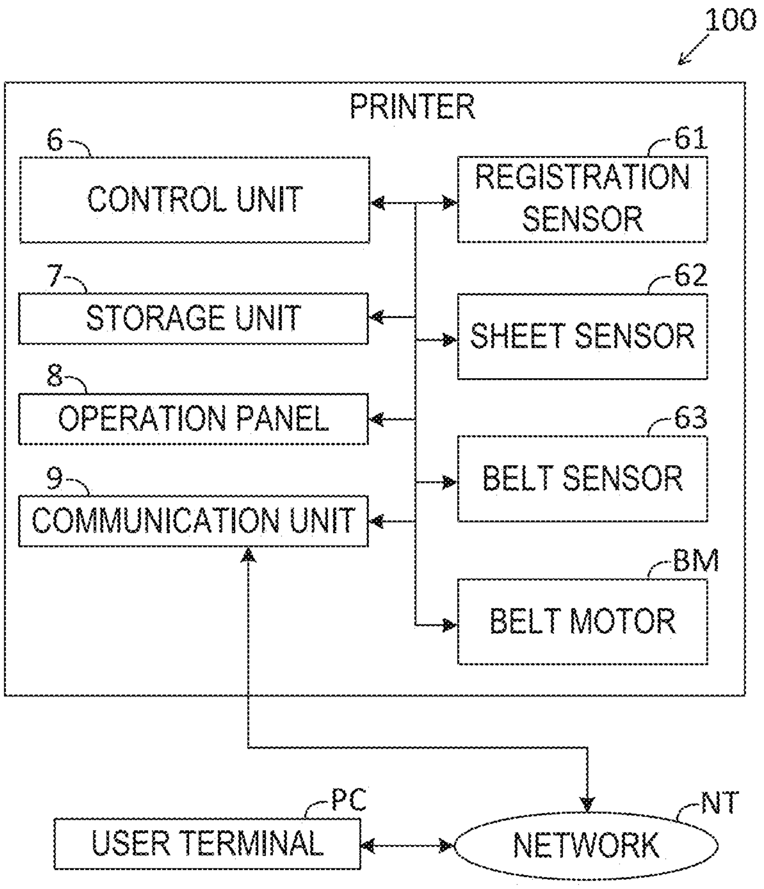
FIG. 4 is a block diagram of the inkjet recording apparatus according to the embodiment.

As shown in FIG. 4, the printer 100 includes a control unit 6. The control unit 6 includes processing circuits such as a CPU and an ASIC. The control unit 6 controls the print job. Specifically, the control unit 6 controls the belt motor BM to appropriately move the conveyance belt 3 (that is, to appropriately rotate the conveyance belt 3). The control unit 6 controls the conveyance of the sheet S performed by the conveyance belt 3. The control unit 6 also controls the discharge of the ink performed by each of the recording heads 40. The control unit 6 further controls the flushing processing the details of which will be described later.

A registration sensor 61, a sheet sensor 62 and a belt sensor 63 are connected to the control unit 6. The detection positions (arrangement positions) of the registration sensor 61, the sheet sensor 62 and the belt sensor 63 are shown in FIG. 3.

The detection position of the registration sensor 61 is a position on the downstream side of the registration nip in the direction of conveyance of the sheet S. The registration sensor 61 is, for example, a reflective optical sensor or a transmissive optical sensor. The registration sensor 61 changes an output value according to whether the sheet S is present in the corresponding detection position.

The control unit 6 detects, based on the output value of the registration sensor 61, the arrival of the front edge of the sheet S at the detection position of the registration sensor 61 and the passage of the back edge of the sheet S through the detection position of the registration sensor 61. In other words, the control unit 6 detects, based on the output value of the registration sensor 61, the arrival of the front edge of the sheet S at the registration nip and the passage of the back edge of the sheet S through the registration nip. The control unit 6 measure, based on a time elapsed after the detection of the arrival of the front edge of the sheet S at the detection position of the registration sensor 61, timing at which the conveyance of the sheet S is started by the registration roller pair 10 (timing at which the rotation of the registration roller pair 10 is started).

The detection position of the sheet sensor 62 is a position between the printing position of the line head 41 on the most upstream side in the direction of conveyance of the sheet S among the line heads 41 and the registration nip. The sheet sensor 62 changes an output value according to whether the sheet S is present in the corresponding detection position. As the sheet sensor 62, a CIS (Contact Image Sensor) may be used or the reflective optical sensor or the transmissive optical sensor may be used. For example, the CIS is used as the sheet sensor 62.

The control unit 6 detects, based on the output value of the sheet sensor 62, the arrival of the front edge of the sheet S at the detection position of the sheet sensor 62 and the passage of the back edge of the sheet S through the detection position of the sheet sensor 62. The control unit 6 measures, based on the output value of the sheet sensor 62, timing at which the ink is discharged to the sheet S conveyed by the conveyance belt 3. Based on a time elapsed after the conveyance of the sheet S is started by the registration roller pair 10, the timing at which the ink is discharged to the sheet S conveyed by the conveyance belt 3 may be measured.

The control unit 6 measures a sheet passage time after the arrival of the front edge of the sheet S at the detection position of the sheet sensor 62 until the passage of the back edge of the same sheet S through the detection position of the sheet sensor 62. The sheet passage time in the detection position of the sheet sensor 62 is changed according to the size of the sheet S in the direction of conveyance of the sheet S. Hence, the control unit 6 recognizes, based on the sheet passage time, the size in the direction of conveyance of the sheet S conveyed by the conveyance belt 3. In this way, even when the sheet S conveyed by the conveyance belt 3 has an irregular size, the control unit 6 can detect the size in the direction of conveyance of the sheet S.

Furthermore, the control unit 6 detects, based on the output value of the sheet sensor 62 (reading data obtained from reading performed by the sheet sensor 62), a displacement of the sheet S (including the skew of the sheet S). For example, after the conveyance of the sheet S is started by the registration roller pair 10, a displacement of the sheet S may occur. In this case, the displacement of the sheet S is detected by the control unit 6.

A plurality of sheet sensors 62 may be installed. For example, two sheet sensors 62 may be installed.

The belt sensor 63 is a sensor for detecting the reference position (home position) of the conveyance belt 3 which is previously determined. In the reference position of the conveyance belt 3, a predetermined mark is provided. In this way, it is possible to detect the reference position of the conveyance belt 3 based on the output value of the belt sensor 63. For example, the CIS is used as the belt sensor 63. The reflective optical sensor or the transmissive optical sensor may be used to form the belt sensor 63.

The control unit 6 detects the reference position of the conveyance belt 3 based on the output value of the belt sensor 63. In other words, the control unit 6 detects, based on the output value of the belt sensor 63, the position of a flushing region 30 (see FIG. 7) in the direction of rotation of the conveyance belt 3.

As shown in FIG. 4, the printer 100 includes a storage unit 7. The storage unit 7 includes storage devices such as a ROM, a RAM, an HDD and an SSD. The storage unit 7 stores various types of information. The storage unit 7 is connected to the control unit 6. The control unit 6 reads information from the storage unit 7. The control unit 6 also writes information to the storage unit 7.

The printer 100 includes an operation panel 8. In the operation panel 8, for example, a touch screen is provided. The touch screen displays software buttons, a message and the like to receive a touch operation from a user. In the operation panel 8, hardware buttons are also provided which receive a setting, an instruction and the like. The operation panel 8 is connected to the control unit 6. The control unit 6 controls the display operation of the operation panel 8 (touch screen). The control unit 6 also detects an operation performed on the operation panel 8.

The printer 100 includes a communication unit 9. The communication unit 9 includes a communication circuit and the like. The communication unit 9 is connected to a user terminal PC via a network NT. The user terminal PC is an information processing device such as a personal computer. The control unit 6 uses the communication unit 9 to communicate with the user terminal PC.

Print data (data including PDL data and the like) for the print job is transmitted from the user terminal PC to the printer 100. In other words, a request for performing the print job is transmitted from the user terminal PC to the printer 100. The print data for the print job includes various types of setting data related to printing such as the size of the sheet S used in the print job. The communication unit 9 receives the print data for the print job. When the communication unit 9 receives the print data for the print job, the control unit 6 determines that the request for performing the print job is received.

<Ink Discharge Configuration>

Figure 5:
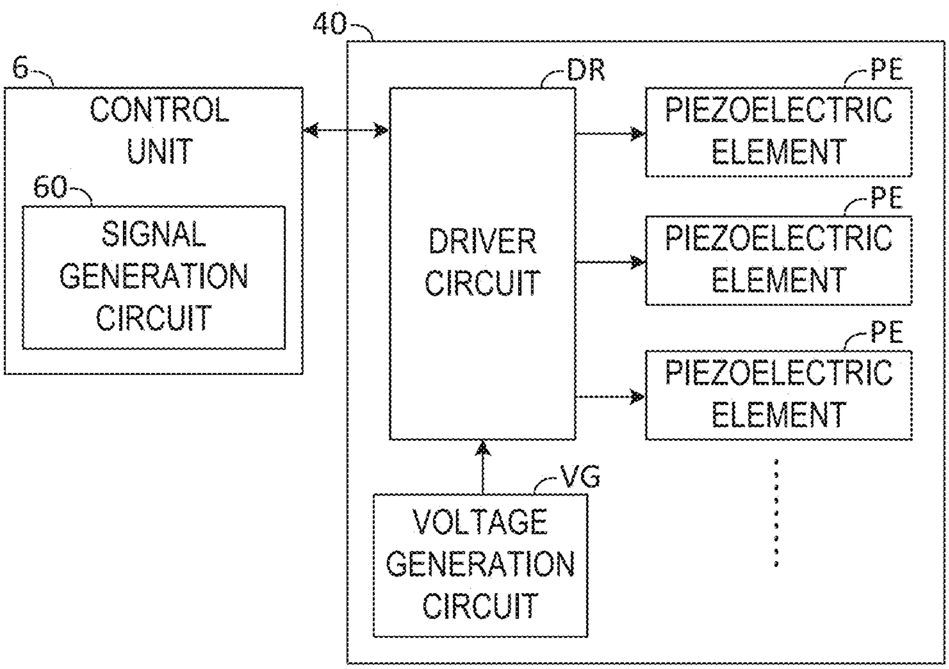
FIG. 5 is a block diagram of a recording head and an area therearound in the inkjet recording apparatus according to the embodiment.
Figure 6:
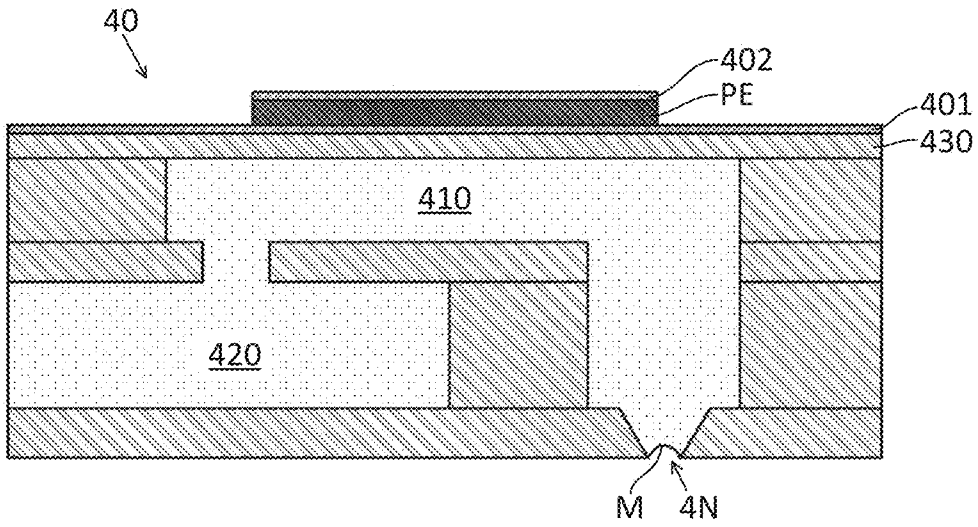
FIG. 6 is a schematic cross-sectional view of a nozzle and an area therearound in the inkjet recording apparatus according to the embodiment.

As shown in FIGS. 5 and 6, each of the recording heads 40 includes piezoelectric elements PE. The piezoelectric element PE corresponds to a "displacement element". One piezoelectric element is assigned to each of the nozzles 4N. A drive voltage is applied to the piezoelectric element PE, and thus the piezoelectric element PE deforms to be driven. Each of the nozzles 4N discharges the ink by the deformation of the corresponding piezoelectric element PE. In FIG. 6, the meniscus of the ink in the nozzle 4N is identified with a symbol of M.

Specifically, each of the recording heads 40 includes a pressurized chamber 410 for each of the nozzles 4N. The pressurized chamber 410 receives supply of the ink from an unillustrated ink tank via a common flow path 420. The pressurized chamber 410 stores the ink supplied from the ink tank. The pressurized chamber 410 communicates with the corresponding nozzle 4N. One piezoelectric element PE is assigned to the pressurized chamber 410. The piezoelectric element PE deforms to be driven by receiving application of a voltage to apply a pressure to the corresponding pressurized chamber 410 so as to change the volume of the corresponding pressurized chamber 410. In this way, the piezoelectric element PE discharges the ink from the nozzle 4N of the corresponding pressurized chamber 410. Instead of the piezoelectric element PE, another displacement element may be used as long as the displacement element can change the volume of the pressurized chamber 410 by deforming to be driven through application of a voltage.

Each of the recording heads 40 includes a vibration plate 430. The vibration plate 430 forms an upper surface of the wall surface of the recording head 40 on a side opposite to the nozzle surfaces in the up/down direction. On the vibration plate 430, a common electrode 401 is arranged. On the common electrode 401, the piezoelectric element PE is arranged. On the piezoelectric element PE, an individual electrode 402 is arranged. In other words, the piezoelectric element PE is sandwiched between the pair of electrodes in the up/down direction (that is, between the common electrode 401 and the individual electrode 402 in the up/down direction). On the common electrode 401, the other piezoelectric elements PE are also arranged. The individual electrode 402 is arranged for each of the piezoelectric elements PE.

Each of the recording heads 40 incudes a voltage generation circuit VG. The recording head 40 includes a driver circuit DR. The voltage generation circuit VG generates a voltage for driving the piezoelectric elements PE to supply the voltage to the driver circuit DR. The driver circuit DR applies the drive voltage supplied from the voltage generation circuit VG to the piezoelectric elements PE. In this way, the driver circuit DR deforms and drives the piezoelectric elements PE.

A pulsed drive signal is input to the driver circuit DR. The drive signal rises, and thus the driver circuit DR applies the voltage to the piezoelectric elements PE to be driven. The drive signal falls, and thus the driver circuit DR stops the application of the voltage to the piezoelectric elements PE. In other words, the driver circuit DR switches, based on the pulsed drive signal which has been input, the turning on and off of the application of the voltage to the piezoelectric elements PE. The driver circuit DR does not apply the voltage to the piezoelectric elements PE which are not driven.

The driver circuit DR is connected to the control unit 6. The control unit 6 includes a signal generation circuit 60 which generates the drive signal to the driver circuit DR. The signal generation circuit 60 generates the pulsed drive signal. The drive signal is a signal for periodically driving the piezoelectric elements PE. The control unit 6 generates the drive signal and inputs it to the driver circuit DR. In other words, the control unit 6 controls the application of the voltage to the piezoelectric elements PE.

<Configuration of Conveyance Belt>

Figure 7:
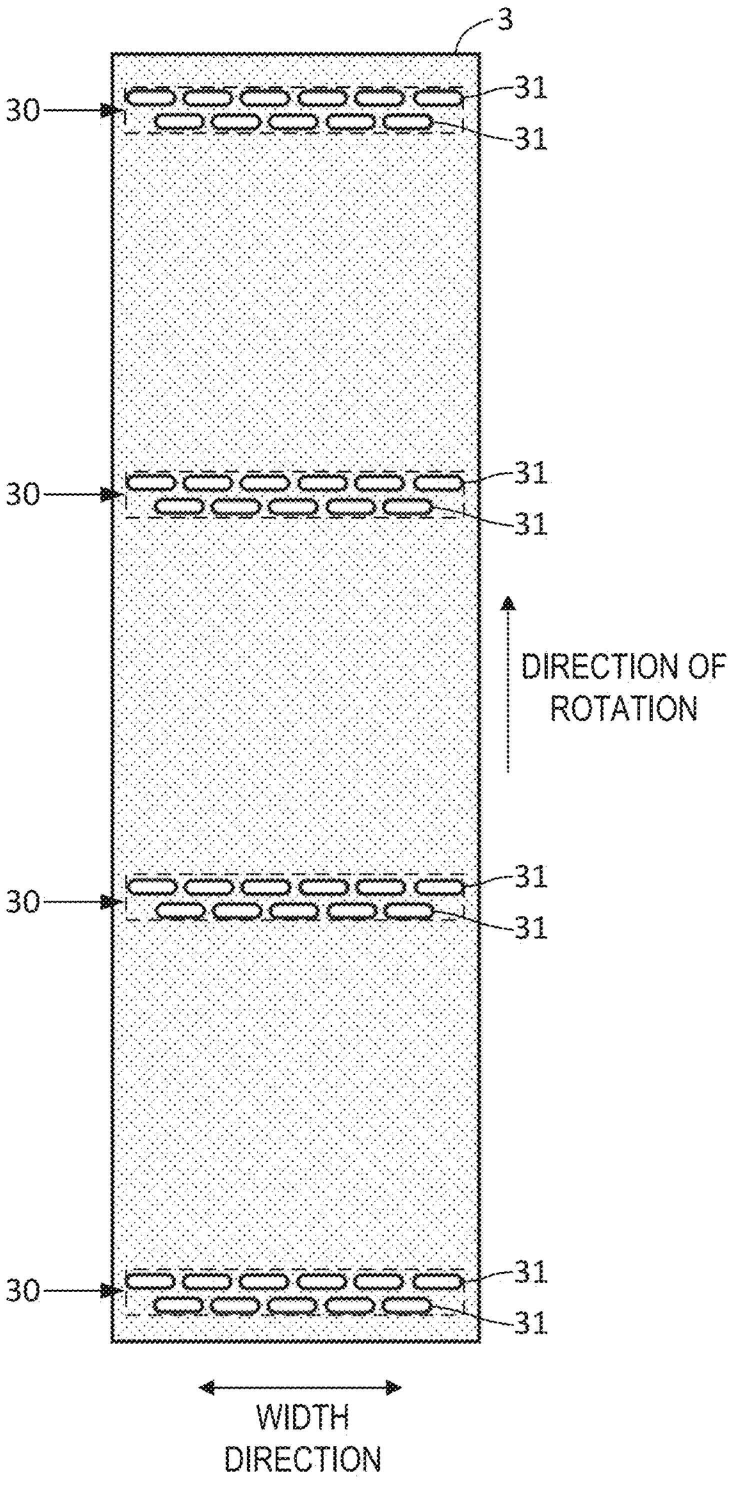
FIG. 7 is a plan view of the conveyance belt in the inkjet recording apparatus according to the embodiment.

As shown in FIG. 7, the conveyance belt 3 includes the flushing regions 30. In FIG. 7, the flushing region 30 is surrounded by dotted lines. The flushing region 30 is a region where openings 31 which penetrate in the direction of thickness of the conveyance belt 3 are formed. Although details will be described later, in the flushing processing, each of the recording heads 40 discharges the ink, and the discharged ink is passed through the openings 31, reaches the inner peripheral side of the conveyance belt 3 and is stored in the waste ink tanks 21.

In the conveyance belt 3, a plurality of flushing region 30 are provided. The flushing regions 30 are spaced a predetermined distance apart from each other in the direction of rotation of the conveyance belt 3. The conveyance belt 3 alternately includes the flushing region 30 and the other region (symbol of which is omitted) in the direction of the rotation.

Each of the flushing regions 30 includes a plurality of (the same number of) openings 31. The opening 31 is a long hole which is long in the width direction of the conveyance belt 3. The shape of the opening 31 (which is viewed in the direction of thickness of the conveyance belt 3) is not particularly limited, and may be a rectangular shape, a circular shape, an elliptical shape or an oval shape.

For example, each of the flushing regions 30 includes two rows of openings. In the row of openings, the openings 31 are arranged at equal intervals in the width direction of the conveyance belt 3. One of the rows of openings includes N (in FIG. 7, six) openings 31, and the other of the rows of openings includes N−1 (in FIG. 7, five) openings 31. The center position of each of the rows of openings in the width direction is arranged in the center position of the conveyance belt 3 in the width direction. In other words, a plurality of openings 31 in each of the flushing regions 30 are arranged in a staggered configuration in the width direction. The length (opening width) of the opening 31 in the width direction is greater than a distance between one of the openings 31 adjacent in the width direction and the other opening 31.

Figure 8:
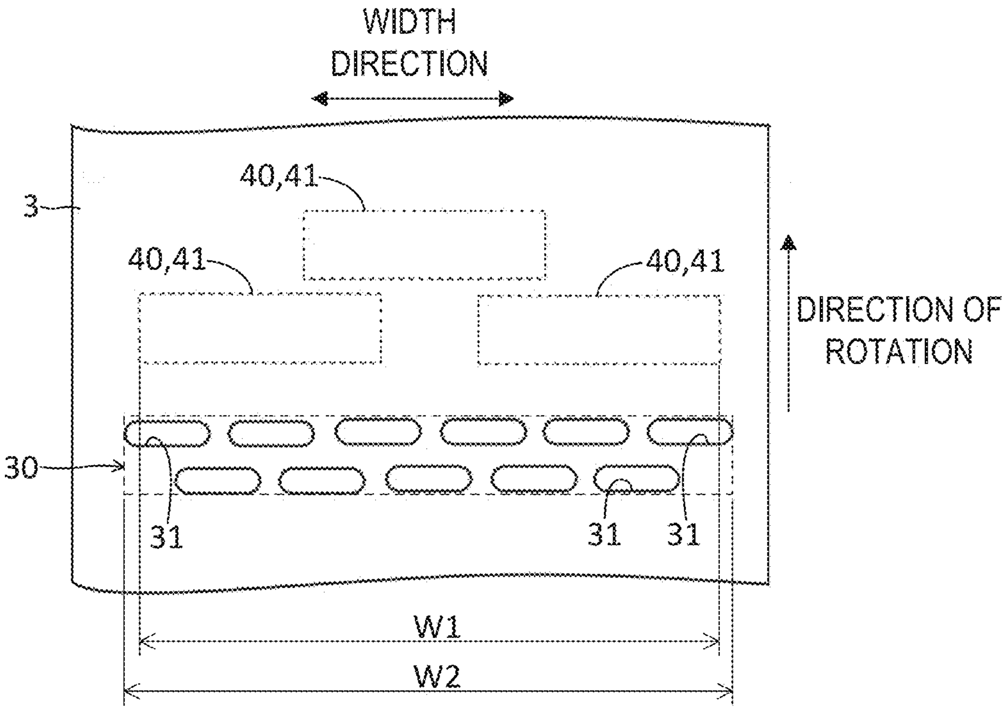
FIG. 8 is a diagram showing a positional relationship between a flushing region in the conveyance belt and recording heads in the inkjet recording apparatus according to the embodiment.

As shown in FIG. 8, a width W1 (mm) is less than a width W2 (mm). The width W1 corresponds to the length of the line head 41 in the width direction. Specifically, the width W1 corresponds to a length in the width direction from the end of the recording head 40 on one side which is located on the one side in the width direction to the end of the recording head 40 on the other side which is located on the other side in the width direction. The width W2 corresponds to the length of the flushing region 30 in the width direction. Specifically, the with W2 corresponds to a length in the width direction from the end of the opening 31 on one side which is located farthest on the one side in the width direction to the end of the opening 31 on the other side which is located farthest on the other side in the width direction.

In this way, the conveyance belt 3 is rotated, and thus each of the nozzles 4N is opposite at least one of the openings 31 in the up/down direction.

<Sheet Conveyance Control>

In a continuous print job serving as the print job in which an image is continuously formed on a plurality of sheets S of the same size conveyed sequentially by the conveyance belt 3, the control unit 6 performs control such that a sheet interval which is a distance in the conveyance direction between the back edge of the preceding sheet S and the front edge of the subsequent sheet S (which is subsequently conveyed after the preceding sheet S) is constant. In other words, the control unit 6 performs control such that a plurality of sheets S are continuously conveyed at regular intervals. Furthermore, in other words, the control unit 6 maintains that each of the sheet intervals generated when the sheets S are continuously conveyed is a constant distance.

Here, in the continuous print job, the control unit 6 recognizes the size of the sheet S which is conveyed by the conveyance belt 3. The control unit 6 also detects the reference position of the conveyance belt 3. The control unit 6 measures timing at which the conveyance of the sheet S is started from the registration roller pair 10 to the conveyance belt 3 such that the flushing region 30 appears between the sheets at regular intervals. The control unit 6 changes, according to the size of the sheet S conveyed by the conveyance belt 3, the timing at which the conveyance of the sheet S is started from the registration roller pair 10 to the conveyance belt 3. The control unit 6 recognizes, based on the print data for the print job, the size of the sheet S (which is conveyed by the conveyance belt 3) used in the print job.

Figure 9:
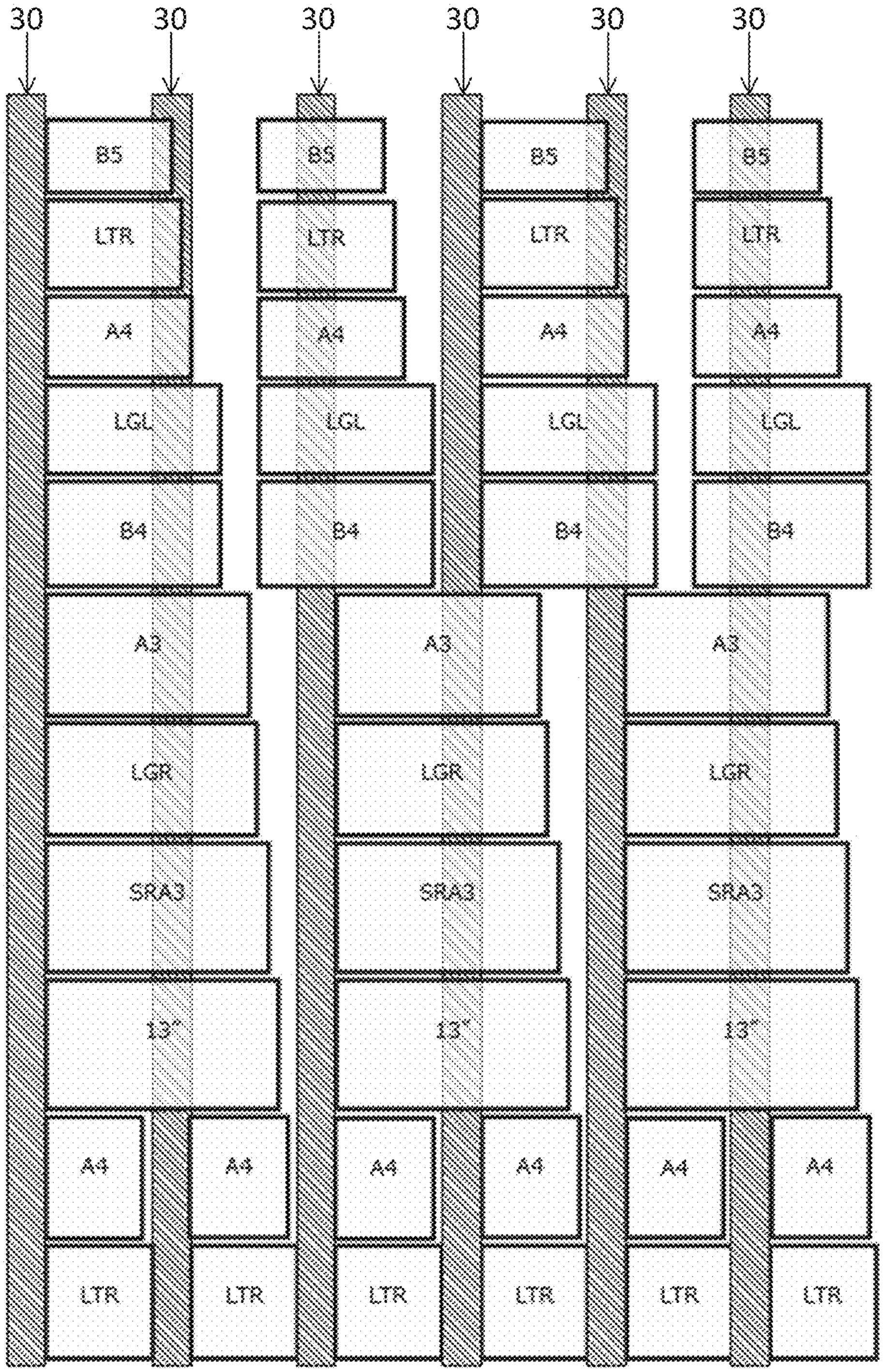
FIG. 9 is a diagram showing a positional relationship between flushing regions in the conveyance belt of the inkjet recording apparatus according to the embodiment and sheets.

A positional relationship between the sheets S conveyed by the conveyance belt 3 and the flushing regions 30 is shown in FIG. 9. In FIG. 9, the direction of rotation of the conveyance belt 3 (that is, the direction of conveyance of the sheet S) is a direction which extends from the right to the left of the plane of the figure. In FIG. 9, the flushing regions 30 are hatched, and the openings 31 are omitted. In FIG. 9, symbols for the sheets S are omitted, and instead, the sizes of the sheets S are provided in the figures of the sheets S. In FIG. 9, for convenience, the sheets S of a plurality of different sizes are shown together.

Figure 10:
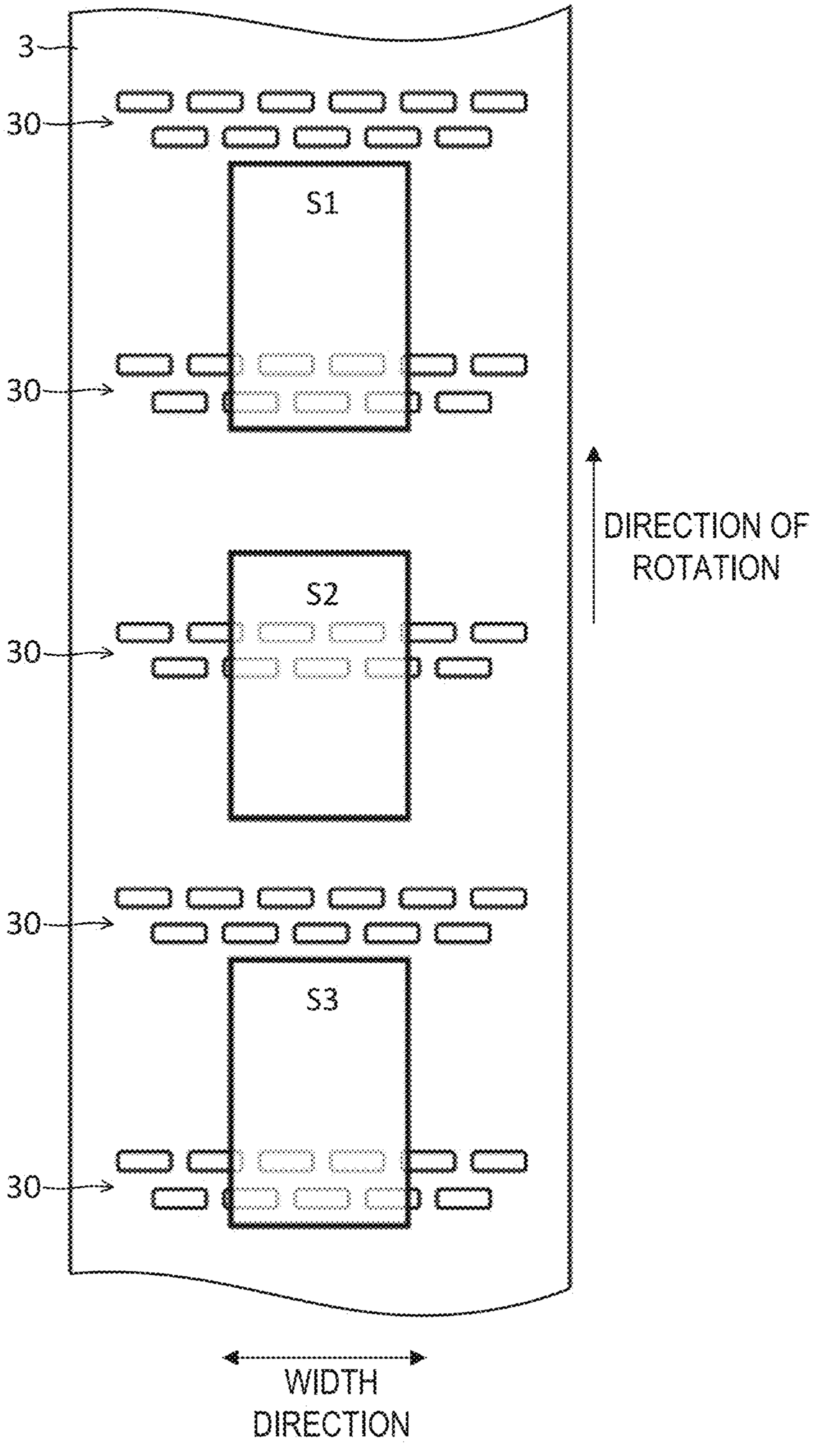
FIG. 10 is a diagram for illustrating timing at which sheets are conveyed to the conveyance belt in the inkjet recording apparatus according to the embodiment.

Here, with reference to FIG. 10, a detail description will be given with attention focused on the sheets S of an A4 vertical size (In FIG. 9, the sheets S shown in the third row from the top). In FIG. 10, the direction of rotation of the conveyance belt 3 (that is, the direction of conveyance of the sheet S) is a direction which extends from the bottom to the top of the plane of the figure. In FIG. 10, for convenience, three sheets S are shown, and as symbols for the sheets S, numbers 1 to 3 indicating the order of conveyance are provided.

When the size of the sheet S is the A4 vertical size, the flushing region 30 does not appear between the first sheet S1 and the second sheet S2. The flushing region 30 appears between the second sheet S2 and the third sheet S3. The flushing region 30 between the second sheet S2 and the third sheet S3 does not overlap the second sheet S2 and the third sheet S3 at all. Although not shown in the figure, the flushing region 30 does not appear between the third sheet S3 and the fourth sheet S, and the flushing region 30 appears between the fourth sheet S and the fifth sheet S.

<Ink Flushing Processing>

Among a plurality of nozzles 4N, the viscosity of the ink in the nozzle 4N which discharges the ink at a low frequency increases over time. Consequently, clogging occurs, and the image quality is lowered. In order to suppress such inconvenience, each of the recording heads 40 performs, while the conveyance belt 3 is being driven, the flushing processing separately from the image formation processing. The image formation processing is processing in which the ink is discharged to the sheet S to form an image on the sheet S.

The flushing processing is processing in which the ink is discharged to the openings 31 in the flushing region 30, among a plurality of flushing regions 30 in the conveyance belt 3, that do not overlap the sheet S from the nozzles 4N of each of the recording heads 40. In other words, the flushing processing is processing in which the ink is discharged from the nozzles 4N of the recording head 40 with timing different from timing at which an image is formed on the sheet S. The ink discharged from the nozzles 4N of the recording head 40 in the flushing processing (hereinafter the ink may be referred to as the flushing ink) does not contribute to image formation. The flushing ink is not directed to the sheet S, and is passed through the openings 31, reaches the inner peripheral side of the conveyance belt 3 and is collected in the waste ink tanks 21. The flushing processing is performed, and thus clogging is suppressed.

A method for controlling the flushing processing will be described below with attention focused on a certain recording head 40. A method for controlling the flushing processing in the other recording heads 40 is omitted because the following description can be used for the method.

While the conveyance belt 3 is being driven, the control unit 6 causes the recording head 40 to perform the flushing processing with timing at which the flushing region 30 that does not overlap the sheet S is opposite the recording head 40 in the up/down direction. For example, in one round of the flushing processing, the recording head 40 discharges the ink from the nozzles 4N a plurality of times. The recording head 40 discharges the ink from the nozzles 4N with the timing at which the recording head 40 is opposite the flushing region 30 in the up/down direction to cause the ink to pass through the openings 31. Since the ink discharged in the flushing processing is passed through the openings 31, the ink is not adhered to the conveyance belt 3.

In the continuous print job, the conveyance of the sheet S is controlled such that the flushing region 30 appears between the sheets at regular intervals. In other words, while the continuous print job is being performed, the flushing region 30 which does not overlap the sheet S is repeatedly brought into a state where the flushing region 30 is opposite the recording head 40 in the up/down direction. Hence, while the continuous print job is being performed, the control unit 6 causes the recording head 40 to perform the flushing processing a plurality of times. While the continuous print job is being performed, the control unit 6 causes the recording head 40 to perform the flushing processing each time the recording head 40 is brought into a state where the recording head 40 is opposite the flushing region 30 in the up/down direction.

Ideally, the flushing ink discharged from the recording head 40 is passed through the openings 31, and thus the ink is not adhered to the conveyance belt 3. However, in some cased, an airflow is disturbed between the nozzle surface of the recording head 40 and the outer peripheral surface of the conveyance belt 3 in the up/down direction. Then, due to the disturbance of the airflow, the flushing ink is agitated by the airflow, with the result that the flushing ink may be prevented from passing through the opening 31. Consequently, an inconvenience may occur in which the flushing ink is adhered to the outer peripheral surface of the conveyance belt 3. When the flushing ink is adhered to the outer peripheral surface of the conveyance belt 3, the flushing ink adhered to the outer peripheral surface of the conveyance belt 3 contaminates the sheet S to be subsequently conveyed (that is, the sheet S which is sucked and attached to the outer circumferential surface of the conveyance belt 3). It is also likely that the flushing ink directly reaches the sheet S to contaminate the sheet S.

It is also likely that the airflow is disturbed between the nozzle surface of the recording head 40 and the outer peripheral surface of the conveyance belt 3 in the up/down direction, and thus the flushing ink is blown back to adhere to the nozzle surface of the recording head 40. In this case, clogging may occur due to the adherence of the flushing ink to the nozzle surface.

Hence, in the present embodiment, the control unit 6 adjusts the flying speed of the flushing ink. Specifically, the control unit 6 controls the application of the voltage to the piezoelectric element PE such that the flying speed of the ink (that is, the flushing ink) discharged from the nozzles 4N during the flushing processing is faster than the flying speed of the ink discharged from the nozzles 4N during the image formation processing. In other words, the flying speed of the flushing ink is the movement speed of the flushing ink from the nozzle surface of the recording head 40 to the outer peripheral surface of the conveyance belt 3.

Figure 11:
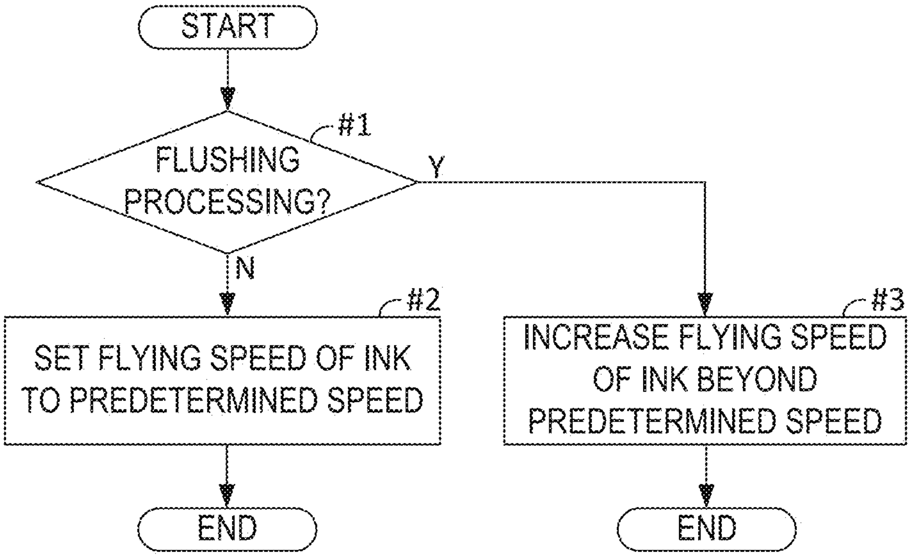
FIG. 11 is diagram showing the flow of processing performed by a control unit in the inkjet recording apparatus according to the embodiment.

In the present embodiment, the control unit 6 performs processing along a flow shown in FIG. 11. Specifically, the control unit 6 determines whether the processing to be performed is the flushing processing of the image formation processing and the flushing processing (step #1). Consequently, when the image formation processing is performed, the process proceeds to step #2 whereas when the flushing processing is performs, the process proceeds to step #3.

When the process proceeds to step #2, the control unit 6 controls the application of the voltage to the piezoelectric element PE such that the flying speed of the ink discharged from the recording head 40 is a predetermined speed. When the process proceeds to step #3, the control unit 6 controls the application of the voltage to the piezoelectric element PE such that the flying speed of the ink discharged from the recording head 40 is faster than the predetermined speed.

In the present embodiment, the flying speed of the ink (that is, the flushing ink) discharged from the nozzles 4N during the flushing processing is faster than the flying speed of the ink discharged from the nozzles 4N during the image formation processing, and thus even when the airflow is significantly disturbed between the nozzle surface of the recording head 40 and the outer peripheral surface of the conveyance belt 3 in the up/down direction, the direction of travel of the flushing ink is unlikely to be displaced between the nozzle surface of the recording head 40 and the outer peripheral surface of the conveyance belt 3 in the up/down direction. In other words, the direction of travel of the flushing ink is unlikely to be affected by the disturbance of the airflow. The direction of travel of the flushing ink is unlikely to be displaced, and thus it is possible to suppress a problem in which the flushing ink reaches an area around the openings 31 without passing through the openings 31.

Consequently, in the present embodiment, it is possible to suppress the adherence of the flushing ink to the outer peripheral surface of the conveyance belt 3. In this way, it is possible to suppress the contamination of the sheet S caused by the movement of the flushing ink adhered to the outer peripheral surface of the conveyance belt 3 to the sheet S. Furthermore, it is possible to suppress the contamination of the sheet S caused by the direct arrival of the flushing ink at the sheet S on the outer peripheral surface of the conveyance belt 3.

It is also possible to suppress a problem in which after the flushing ink is discharged from the nozzle surface of the recording head 40, the flushing ink is blown back to adhere to the nozzle surface. In this way, it is possible to suppress clogging. In other words, it is possible to suppress a decrease in the image quality. It is also possible to suppress a failure in the recording head 40 caused by the adherence of the flushing ink to the recording head 40.

For example, in the present embodiment, the control unit 6 performs at least one of first processing and second processing such that the ink (that is, the flushing ink) discharged from the nozzles 4N during the flushing processing is faster than the flying speed of the ink discharged from the nozzles 4N during the image formation processing.

As the first processing, the control unit 6 increases the voltage applied to the piezoelectric element PE during the flushing processing beyond the voltage applied to the piezoelectric element PE during the image formation processing. In this way, it is possible to easily increase the flying speed of the flushing ink beyond the flying speed of the ink discharged during the image formation processing.

As the second processing, the control unit 6 causes the waveform of the voltage applied to the piezoelectric element PE during the flushing processing to differ from the waveform of the voltage applied to the piezoelectric element PE during the image formation processing. In this configuration, based on at least one of materials and the positional relationship of constituent elements of the recording head 40, the distance between the nozzle surface of the recording head 40 and the outer peripheral surface of the of the conveyance belt 3, the diameter of the opening of the nozzle 4N, the width and the length of an ink flow path from the pressurized chamber 410 to the nozzle 4N, the type of piezoelectric element PE and the type of ink (that is, the viscosity), the optimal waveform of the voltage applied to the piezoelectric element PE during the flushing processing is experimentally determined such that the flying speed of the flushing ink is faster than the flying speed of the ink discharged during the image formation processing, with the result that the waveform is determined.

In this way, it is possible to easily increase the flying speed of the flushing ink beyond the flying speed of the ink discharged during the image formation processing. For example, the meniscus M (see FIG. 6) of the ink in the nozzle 4N swings in the up/down direction. Hence, the optimal waveform of the voltage applied to the piezoelectric element PE during the flushing processing is determined such that when the meniscus M swings downward, the ink is discharged from the nozzle 4N.

For example, the flying speed of the flushing ink is set to 1.05 times or more the flying speed of the ink discharged from the nozzles 4N during the image formation processing. In this way, it is possible to suppress a problem in which the direction of travel of the flushing ink is affected by the disturbance of the airflow.

However, when the flying speed of the flushing ink is excessively high, the formation of the flushing ink into a mist is facilitated, and thus the direction of travel of the flushing ink may easily be affected by the disturbance of the airflow. Hence, the flying speed of the flushing ink is set to twice or less the flying speed of the ink discharged from the nozzles 4N during the image formation processing. In this way, it is possible to suppress the facilitation of the formation of the flushing ink into a mist (that is, the problem in which the direction of travel of the flushing ink is easily affected by the disturbance of the airflow).

It should be considered that the embodiment disclosed herein is illustrative in all respects, and not restrictive. The scope of the present disclosure is indicated not by the description of the above embodiment but by the scope of claims, and furthermore, meanings equivalent to the scope of claims and all changes in the scope are included therein.

What is claimed is:

1. An inkjet recording apparatus comprising:

a conveyance belt that conveys a recording medium;

a recording head that includes a pressurized chamber which stores an ink, a nozzle which communicates with the pressurized chamber and a displacement element which deforms by receiving application of a voltage to apply a pressure to the pressurized chamber so as to discharge the ink from the nozzle, the recording head discharging the ink to the recording medium to form an image on the recording medium; and a control unit that controls the recording head, wherein the conveyance belt includes a flushing region in which an opening is formed, a plurality of flushing regions are spaced in a direction of movement of the conveyance belt, the control unit causes the recording head to perform flushing processing separately from image formation processing that discharges the ink to the recording medium, and in the flushing processing, the ink is discharged to the opening in at least one of the flushing regions that does not overlap the recording medium and the control unit controls the application of the voltage to the displacement element such that a flying speed of the ink discharged from the nozzle during the flushing processing is faster than a flying speed of the ink discharged from the nozzle during the image formation processing.

2. The inkjet recording apparatus according to claim 1, wherein the control unit increases the voltage applied to the displacement element during the flushing processing beyond the voltage applied to the displacement element during the image formation processing such that the flying speed of the ink discharged from the nozzle during the flushing processing is faster than the flying speed of the ink discharged from the nozzle during the image formation processing.

3. The inkjet recording apparatus according to claim 1, wherein the control unit causes a waveform of the voltage applied to the displacement element during the flushing processing to differ from a waveform of the voltage applied to the displacement element during the image formation processing such that the flying speed of the ink discharged from the nozzle during the flushing processing is faster than the flying speed of the ink discharged from the nozzle during the image formation processing.

4. The inkjet recording apparatus according to claim 3, wherein the waveform of the voltage applied to the displacement element during the flushing processing is determined based on at least one of:

materials and a positional relationship of constituent elements of the recording head;

a distance between the nozzle and the conveyance belt;

a diameter of an opening of the nozzle;

a width and a length of an ink flow path from the pressurized chamber to the nozzle;

a type of the displacement element; and a type of the ink.

5. The inkjet recording apparatus according to claim 1, wherein the flying speed of the ink discharged from the nozzle during the flushing processing is 1.05 times or more the flying speed of the ink discharged from the nozzle during the image formation processing.

6. The inkjet recording apparatus according to claim 5, wherein the flying speed of the ink discharged from the nozzle during the flushing processing is twice or less the flying speed of the ink discharged from the nozzle during the image formation processing.

* * * * *